Sept. 22, 1931.    W. C. BAUER    1,823,882
FIRE EXTINGUISHER
Filed March 5, 1929
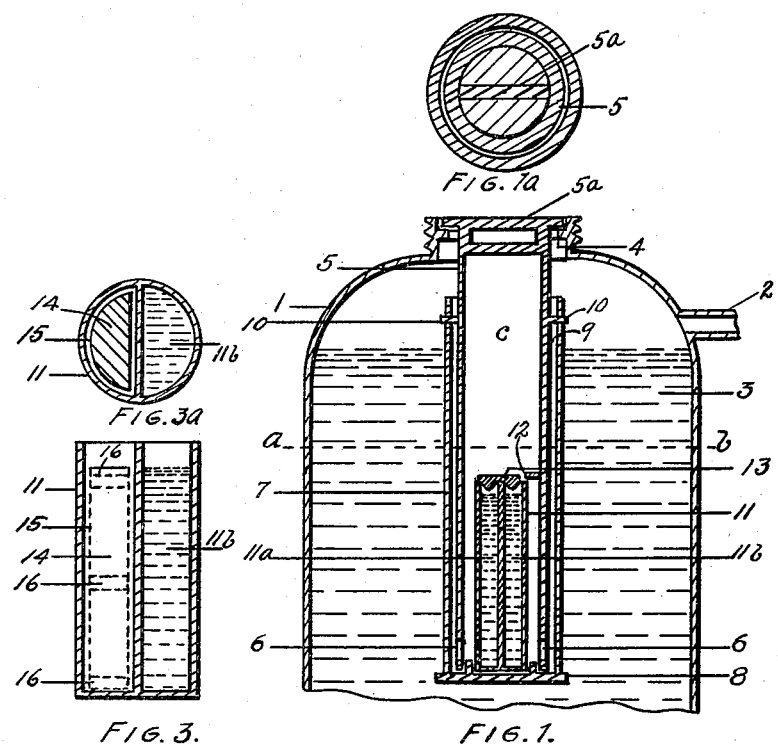
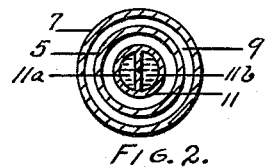
WITNESSES
INVENTOR
William Charles Bauer Patented Sept. 22, 1931

1,823,882

UNITED STATES PATENT OFFICE

WILLIAM CHARLES BAUER, OF EVANSTON, ILLINOIS

FIRE EXTINGUISHER

Application filed March 5, 1929. Serial No. 344,537.

My invention relates to a fire extinguisher which operates with high efficiency and with extreme rapidity not only at normal temperatures but also at low temperatures.

My object is to provide special chemicals for the generation of gas for expelling a suitable fire-extinguishing fluid from a main container and a further object is to provide an extinguisher of novel and of improved design in order to utilize properly the reaction of said chemicals so that gas pressure will be produced almost instantly with high efficiency not only at normal temperatures but also at a temperature as low as $-40°$ F.

For the generation of gas in an extinguisher it has been the practice to utilize a carbonate solution and an acid solution to liberate carbon dioxide gas. It is my purpose to generate not only carbon dioxide gas but also nitrogen gas both of which are non-inflammable. To generate these two gases simultaneously I utilize an organic amide which can be completely broken down by the action of suitable agents. Typical of such organic amides is the chemical termed carbamide, commonly called urea, which has two amide ($NH_2$) groups in its molecule. Its chemical formula is $CO(NH_2)_2$. The carbon dioxide gas of the gaseous mixture can be gotten solely from this compound but when it is desired to have a larger amount in proportion to the nitrogen than that obtainable from urea, a suitable carbonate may be added to augment the organic compound.

Urea may be broken down or decomposed in more than one way but I prefer the method of treating it with nitrous acid ($N_2O_3$) which is liberated in the presence of the urea in any suitable manner. I prefer to generate it by the action of any suitable acid such as hydrochloric or sulphuric acid or by the action of both acids on any suitable metallic nitrite, as for example, a nitrite of an alkali or an alkali earth metal. These nitrites are not the only ones available and it is not my intention to limit myself to these. The chemical reaction is given in Equation (1).

$$CO(NH_2)_2 + N_2O_3 = CO_2 + 2N_2 + 2H_2O. \quad (1)$$

Equation (2) below shows the complete reaction between the urea, the nitrite and the acid.

Assume $H_2SO_4$ and $KNO_2$ to be used $$CO(NH_2)_2 + 2KNO_2 + H_2SO_4 = \\ CO_2 + 2N_2 + 3H_2O + K_2SO_4. \quad (2)$$

When hydrochloric acid is used the reaction is $$CO(NH_2)_2 + 2KNO_2 + 2HCl = \\ CO_2 + 2N_2 + 3H_2O + 2KCl. \quad (3)$$

When both HCl and $H_2SO_4$ acids are used the reaction is $$2CO(NH_2)_2 + 4KNO_2 + 2HCL + H_2SO_4 = \\ 2CO_2 + 4N_2 + 6H_2O + 2KCl + K_2SO_4. \quad (4)$$

When a carbonate is also added, the reaction is shown in Equation (5).

$$CO(NH_2)_2 + 2KNO_2 = K_2CO_2 + 2H_2SO_4 = \\ 2CO_2 + 2N_2 + 4H_2O + 2K_2SO_4. \quad (5)$$

By increasing the proportion of the carbonate to the urea the amount of $CO_2$ in proportion to the N may be varied at will.

While I have shown in Equation (5) the effect of adding a carbonate it is to be understood that such an addition is not an absolute essential, for the urea together with the nitrite, as shown in Equations (2) to (4), react alone with high efficiency. The carbonate is added only when it is desired to increase the proportion of the $CO_2$ gas. The heat of the reaction of a nitrite, an acid and urea is so great that a carbonate, which would react sluggishly at low temperatures if it were used alone, reacts with enhanced activity because of the elevation of temperature. Therefore the gas producing chemical mixture can be somewhat cheapened by using a cheap carbonate along with the urea and the nitrite.

When $CO_2$ alone is generated from a carbonate the reaction takes place as shown in Equation (6).

$$K_2CO_2 + H_2SO_4 = CO_2 + H_2O + K_2SO_4. \quad (6)$$

The high efficiency of generating gas pressure in accordance with my invention by simultaneously generating both gases from an amide as shown in Equation (2) can be seen by comparing Equation (2) with Equation (6). According to Equation (6) one molecule of sulphuric acid produces one molecule of carbon dioxide gas whereas according to Equation (2) one molecule of acid produces not only the same amount of carbon dioxide but also in addition thereto two molecules of nitrogen gas. The gas producing efficiency of the acid has therefore been very considerably increased. This is of especial importance when low temperatures are encountered. According to the underwriters' requirements the ejected liquid must be thrown from 30 to 40 feet, therefore an almost instantaneous pressure is required. If the gas pressure is not immediately built up some of the liquid will be wasted because it will not be thrown the proper distance.

There is an added advantage in utilizing the reaction of Equation (2) because a very much larger amount of heat is evolved than according to Equation (6). When the initial temperature is low this evolution of heat is of the highest importance because it rapidly accelerates the reaction and thus rapidly builds up the gas pressure. To utilize this generation of heat to the highest advantage, which is so essential at low temperatures, I confine the chemical reaction within a small gas producing chamber which communicates with the main containing vessel. I find that by this arrangement the gases are evolved at a fairly high temperature and that by allowing these hot gases to bubble up through the extinguishing fluid the entire action of the extinguisher is enhanced at low temperatures. These features will be clearly set forth hereinafter.

I am aware that attempts have been made to utilize certain other amides having one amide ($NH_2$) group to the molecule as for example acetamide which is disclosed in Patent No. 410,326, but such attempts have failed because such amides like acetamide and like cyanamide, which is also mentioned, react chemically in a different manner. Such amides are not completely decomposed by nitrous acid and they only produce nitrogen gas as is shown in Equation (7).

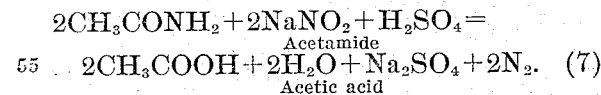

$$2CH_3CONH_2 + 2NaNO_2 + H_2SO_4 =$$
Acetamide
$$2CH_3COOH + 2H_2O + Na_2SO_4 + 2N_2. \quad (7)$$
Acetic acid Such a reaction is exceedingly inefficient because all of the carbon of the acetamide remains uselessly locked up as a constituent of the organic acid which is produced, and the gas producing efficiency is therefore exceedingly low. To produce 56 parts by weight of N requires 118 parts of acetamide whereas to produce 56 parts of N from urea requires only 60 parts of the latter but in addition to producing the same amount of N, urea also produces 44 parts of $CO_2$.

There are a number of ways in which these special chemicals may be utilized and it is not my intention to limit myself to any particular method. For example, (a) the nitrite and the urea may be mixed and used in a solid state either alone or with the addition of a carbonate together with a normally isolated acid solution; (b) the nitrite may be used alone or mixed with a carbonate in a solid state together with a normally isolated acid solution of urea. When these bodies are used in the solid state I then prefer to use them in a special extinguisher described in my copending application or they may be used as explained hereinafter.

While a nitrite and the urea may be advantageously used in the solid state as above described still there are cases when solutions of all the ingredients are desired. Again, there are several ways to utilize these special chemicals in solutions, but it is not my intension to limit myself to any particular method. However, I will describe a preferred method and one which gives excellent results. For extinguishers which are to be used at normal temperatures it is simply necessary to dissolve the requisite quantity of a suitable nitrite, as for example sodium or potassium nitrite in the proper amount of water to form one solution and to use any suitable acid solution of urea for the second solution or the nitrite and the urea may be dissolved in water to form one solution and the acid dissolved in water for the second solution. For temperatures as low as $-10°$ F. to $-15°$ F. I prefer to dissolve the proper quantity of potassium or lithium nitrite in water for one solution and for the second solution I dissolve the urea in a suitable acid. Urea is very soluble in either HCl or $H_2SO_4$ acid or in a mixture of the two acids. For a temperature of $-25°$ F. I prefer a suitable concentrated solution of potassium nitrite, or lithium nitrite for one solution and for the second solution either a HCl acid solution of urea or a $HCl-H_2SO_4$ acid solution of urea. For a temperature of $-40°$ F. a fairly concentrated solution of potassium nitrite is used to which is added approximately 40% of concentrated ammonium hydroxide or a suitable quantity of potassium hydroxide. The acid urea solution to co-act with the latter nitrite solution and capable to withstand this low temperature is preferably made by dissolving the requisite quantity of urea in a mixture of HCl and $H_2SO_4$ acid. While I do not wish to limit myself definitely to the proportions given below, because I find that the proportion can be considerably varied, nevertheless I will cite the following solution as giving excellent results. A solution is made containing approximately two parts by volume of HCl acid (Sp. Gr. 0.9), one part by volume of $H_2SO_4$ (Sp. Gr. 1.84), and one fourth part by volume of water and dissolving therein the suitable quantity of urea. Such a solution can readily withstand a temperature of $-40°$ F. and I have been able to make solutions by varying the proportions so that they can withstand a temperature as low as $-65°$ F. without freezing.

As explained above, when an extinguisher must operate almost instantly at a temperature as low as $-40°$ F. it is highly essential to utilize to the highest degree the heat of the chemical reaction to heat up the mass of the reacting chemicals. To realize the advantage of the large amount of heat evolved by the reactions shown in Equations (1) to (5), it is necessary to confine the chemical reaction and the reacting substances in a comparatively small space. My invention therefore further provides proper mechanical devices to enable the reactions to proceed at such low temperatures.

The drawings illustrate my extinguisher embodying my present invention. Fig. 1 is a vertical section of approximately the upper half of an extinguisher and Fig. 1a is a top view of the opening of the main vessel. Fig. 2 is a view on the line $a$—$b$. Fig. 3 is a vertical detail section of a portion of the interior chamber and Fig. 3a is a top view of Fig. 3.

In the preferred form of extinguisher, 1 is a main containing vessel supplied with a suitable nozzle 2 and holding a suitable fire-extinguishing fluid 3 as for example a solution of calcium chloride, carbon tetrachloride or the like. Supported in any suitable manner as for example by the shoulder 4 in the opening of the main vessel is a vertical tube 5. The tube or chamber 5 is sealed at the top and open at the bottom through suitable openings 6 and it is provided with a handle 5a to facilitate its removal from the main container 1. Surrounding the tube 5 is a slightly larger tube 7 closed by the bottom 8 and open at the top, and forming the annular space 9 between them. Tube 7 is secured to tube 5 in any suitable manner by pins 10 but readily removable therefrom by twisting it. Tube 7 is long enough to extend above the normal liquid level of the solution 3. Within the tube or chamber 5 is a suitable double container 11 having two compartments holding two solutions 11a and 11b. This is held in place by resting in the depression of the bottom 8 of tube 7 and when inverted, by the projecting pin 12 secured to tube 5. Container 11 is shown closed by a loosely fitting cork 13. The chemicals above described are properly isolated from each other by placing the acid solution in one compartment 11b and the other ingredients in the second compartment 11a. Both compartments 11a and 11b may contain the ingredients in the form of solutions, as shown in Fig. 1, or if some of the ingredients are used in a solid state then one of the compartments holds the solid material 14 shown in Fig. 3 in a loose granular state or it holds a perforated metal container 15 such as is described in by co-pending application holding the solid ingredient 14. This metal container 15 is smaller in size than the compartment 11a so that it can readily drop out into space (c) of container 5 when the extinguisher is inverted. As described in my co-pending application, when a solid is used, it is desirable to divide the solid granular material into several portions by permeable spacers 16. These together with the spaces between the granules aid in the intermingling of the acid solution to produce rapid chemical action. When the extinguisher is inverted the contents of both compartments drop into the space (c) wherein the confined chemicals then react with extreme rapidity because the heat of the initial reaction heats up the mass of the reacting chemicals. The hot $CO_2$ and N gases pass from the tube 5 through the openings 6 into the annular space 9 between the tubes 5 and 7 and emerge from the open end of 7 to bubble up through the cold liquid 3 thus partially elevating the temperature of the latter making it more mobile.

I have described herein certain preferred methods and embodiments for utilizing my improved gas producing chemicals and I have shown suitable mechanical means to properly utilize their action efficiently, however I wish it distinctly understood that my invention is not limited to such exact and precise embodiments but contemplates all such variants and modifications which would by clearly equivalents.

Having thus described my invention, what I claim as new and desire to secure by Letters Patent is:—

1. In a fire extinguisher, a main containing vessel holding a suitable fire-extinguishing liquid capable of withstanding a temperature of $-40°$ F. without freezing, and gas producing chemicals for ejecting said liquid including a suitable metallic nitrite, urea, and a suitable acid, the said chemicals being in suitable physical states so as to react properly with each other at a temperature as low as $-40°$ F. but which are normally properly isolated to prevent action until the said extinguisher is to operate when by suitable means they are allowed to react to produce gas pressure to accomplish said ejection.

2. In a fire extinguisher, a main containing vessel holding a suitable fire-extinguishing liquid capable of withstanding a temperature of $-40°$ F. without freezing, and gas producing chemicals for ejecting said liquid including a suitable metallic nitrite, a carbonate, urea and a suitable acid, the said chemicals being in suitable physical states so as to react properly with each other at a temperature as low as −40° F. but which are normally properly isolated to prevent action until the said extinguisher is to operate when by suitable means they are allowed to react to produce gas pressure to accomplish said ejection.

3. In a fire extinguisher, a main containing vessel supplied with a suitable nozzle and holding a suitable fire-extinguishing liquid which can withstand a temperature of −40° F. without freezing, within said vessel a smaller chamber consisting of two vertical tubes, an inner tube closed at the top and open near the bottom and an outer tube of larger diameter surrounding said inner tube forming an annular space between them, said outer tube closed at the bottom and open at the top and extending above the liquid level in the said main vessel, within said inner tube gas producing chemicals including in suitable combination the organic chemical called urea, a suitable metallic nitrite and a suitable acid solution which can withstand a temperature of −40° F. without freezing.

4. In a fire extinguisher, a main containing vessel supplied with a suitable nozzle and holding a fire-extinguishing liquid which can withstand a temperature of −40° F. without freezing, an inner connecting auxiliary gas producing chamber in which are confined the gas producing chemicals and the chemical action thereof, the said chemicals including a suitable metallic nitrite, urea, and a suitable acid, and the said chemicals being in a suitable physical state so as to react properly with each other not only at normal temperatures but also at a temperature as low as −40° F.

5. In a fire extinguisher, in combination with a main containing vessel holding a suitable fire-extinguishing liquid, an auxiliary connecting chamber holding gas producing chemicals including an organic amide termed urea, a suitable metallic nitrite and a suitable acid, said chemicals being properly isolated to prevent action until the extinguisher is to be placed in operation when by suitable means said chemicals are brought together to generate both carbon dioxide and nitrogen gas to eject said extinguishing liquid from said main vessel.

6. In a fire extinguisher, in combination, an extinguishing liquid which will remain liquid at −40° F. and gas producing chemicals to expel said liquid from a main container, said chemicals including a normally isolated mixture of a metallic nitrite and a carbonate and a solution of urea in a mixture of HCl and $H_2SO_4$ acids which can withstand a temperature of −40° F. without freezing.

7. In a fire extinguisher for the purpose of producing non-inflammable gases, in suitable combination, a nitrite of a metal, a carbonate of a metal, an organic amide termed urea having 2 amide ($NH_2$) groups to the molecule and a suitable acid.

8. In a fire extinguisher for the purpose of producing both carbon dioxide and nitrogen gas simultaneously, in combination, a suitable acid and a suitable nitrate which when brought together by their interaction will produce nitrous acid ($N_2O_3$), and an organic amide which by the action of said nitrous acid is broken down completely producing both $CO_2$ and N gas.

9. In a fire extinguisher for the purpose of producing both carbon dioxide and nitrogen gas simultaneously, in suitable combinations, chemicals which are normally isolated but which when brought together produce nitrous acid ($N_2O_3$) and an organic chemical which is acted upon by said nitrous acid to produce both carbon dioxide and nitrogen gas.

10. In a fire extinguisher, in combination, a main containing vessel holding a fire-extinguishing fluid, an auxiliary chamber communicating with said main vessel and containing in suitable containers gas producing chemicals, properly isolated from each other and including a solution of a metallic nitrite and a suitable acid solution of urea.

11. In a fire extinguisher, for the purpose of producing simultaneously carbon dioxide and nitrogen gas, the organic body called urea containing more than one amide group ($NH_2$) in its molecule and chemical means for decomposing it to produce said gases.

12. In a fire extinguisher, for the purpose of producing simultaneously both carbon dioxide and nitrogen gas, a chemical composition including the organic body called urea and a chemical to react therewith to decompose it to produce said gases.

13. In a fire extinguisher, a main containing vessel supplied with a suitable discharge nozzle and holding a fire-extinguishing liquid capable of remaining liquid at −40° F., a communicating smaller gas producing chamber containing chemicals to produce carbon dioxide and nitrogen gas, said chemicals including urea dissolved in a mixture of HCl and $H_2SO_4$ acid and isolated therefrom a solution containing an alkali nitrite, both of said solutions being capable of remaining liquid at −40° F.

14. In a fire extinguisher for the purpose of producing gas, gas producing chemicals including in suitable solutions, and properly isolated so as to prevent action until said extinguisher is to operate, the chemicals urea, an alkali nitrite and a suitable acid.

15. In a fire extinguisher for the purpose of producing non-inflammable gas, two solutions properly isolated from each other until said extinguisher is to operate, the said solutions being capable of remaining liquid at a temperature of −40° F., one of said solutions including urea, hydrochloric and sulphuric acids and water and the other of said solutions including an alkali nitrite, ammonia and water.

16. In a fire extinguisher for the purpose of producing non-inflammable gas consisting of carbon dioxide and nitrogen gas, two solutions properly isolated from each other, one containing urea dissolved in an acid and the other a suitable nitrite dissolved in water.

17. In a fire extinguisher for the purpose of producing both carbon dioxide and nitrogen gas from the organic body urea, in suitable combination but isolated from each other a solution containing urea and an acid capable of remaining liquid at −40° F. and a second solution also capable of remaining liquid at −40° F. and containing a metallic nitrite.

18. In a fire extinguisher for the purpose of producing both carbon dioxide and nitrogen gas chemicals including, an acid solution of urea capable of remaining liquid at −40° F. and a normally isolated alkali solution of an alkali nitrite which can remain liquid at −40° F.

19. In a fire extinguisher for the purpose of producing both carbon dioxide and nitrogen gas chemicals including urea, a nitrite and an acid, said chemicals being in solutions capable of withstanding a temperature of −40° F. without freezing, and one of said solutions which contains the said acid being normally isolated from the solution which contains the said nitrite.

20. In a fire extinguisher for the purpose of producing both carbon dioxide and nitrogen, in combination, a suitable nitrite in a suitable physical state and normally isolated therefrom an acid solution of urea comprising sulphuric acid.

21. In a fire extinguisher for the purpose of producing both carbon dioxide and nitrogen, in combination, a suitable nitrite in a suitable physical state and normally isolated therefrom an acid solution of urea comprising hydrochloric acid.

22. In a fire extinguisher for the purpose of generating carbon dioxide and nitrogen from urea, the said urea being dissolved in a mixture of $HCl$ and $H_2SO_4$ acids of proper density, and all of the said ingredients being in such proportions as to form a solution which can remain liquid at −40° F.

23. In a fire extinguisher for the purpose of producing gas, in suitable combination, the organic chemical called urea having the chemical formula $CO(NH_2)_2$, an acid, and an alkali solution of an alkali nitrite.

24. In a fire extinguisher for the purpose of producing gas, in combination, the organic chemical called urea having the chemical formula $CO(NH_2)_2$ and dissolved in a suitable acid, and a suitable nitrite dissolved in an alkali hydroxide, the said acid solution of urea being isolated from the said alkali solution of a suitable nitrite until the said extinguisher is to operate when the said two solutions are brought together by any suitable means.

WILLIAM CHARLES BAUER.

Certificate of Correction

Patent No. 1,823,882.  Granted September 22, 1931, to

WILLIAM CHARLES BAUER

It is hereby certified that error appears in the printed specification of the above-numbered patent requiring correction as follows: Page 1, line 65, equation 4, for "HCL" read $HCl$; lines 70 and 71 strike out equation 5, and insert instead $$CO(NH_2)_2 + 2KNO_2 + K_2CO_3 + 2H_2SO_4 = 2CO_2 + 2N_2 + 4H_2O + 2K_2SO_4;$$

line 97, equation 6, for "$K_2CO_2$" read $K_2CO_3$; page 2, line 54, strike out the word "Acetamide" and insert the same under "$2CH_3CONH_2$" and line 56, strike out the words "Acetic acid" and insert the same under "$2CH_3COOH$"; same page, line 89, for the misspelled word "intension" read *intention;* page 3, line 72, for "by" read *my;* page 4, line 75, claim 8, for "nitrate" read *nitrite;* and that the said Letters Patent should be read with these corrections therein that the same may conform to the record of the case in the Patent Office.

Signed and sealed this 10th day of November, A. D. 1931.

[SEAL.]

M. J. MOORE,
*Acting Commissioner of Patents.*